United States Patent
Maillot et al.

(10) Patent No.: US 8,601,398 B2
(45) Date of Patent: Dec. 3, 2013

(54) DATA-DRIVEN INTERFACE FOR MANAGING MATERIALS

(75) Inventors: Jérôme Maillot, Cazaux (FR); Andre Gauthier, St-Jacques-Le-Mineur (CA); John Schrag, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1013 days.

(21) Appl. No.: 12/250,458

(22) Filed: Oct. 13, 2008

(65) Prior Publication Data
US 2010/0095247 A1 Apr. 15, 2010

(51) Int. Cl.
*G06F 3/048* (2013.01)
(52) U.S. Cl.
USPC .......... 715/853; 715/838; 715/835; 715/854; 715/964
(58) Field of Classification Search
USPC ......... 715/838, 835, 836, 839, 852, 853, 964; 700/97, 98, 118
See application file for complete search history.

(56) References Cited

U.S. PATENT DOCUMENTS

| | | | |
|---|---|---|---|
| 4,970,666 A * | 11/1990 | Welsh et al. ............... 345/423 |
| 5,481,665 A | 1/1996 | Okada et al. |
| 5,604,824 A | 2/1997 | Chui et al. |
| 5,696,892 A | 12/1997 | Redmann et al. |
| 5,790,131 A | 8/1998 | Liang et al. |
| 5,835,093 A | 11/1998 | Fujishita et al. |
| 5,886,701 A | 3/1999 | Chauvin et al. |
| 5,991,770 A * | 11/1999 | Zamora-McKelvy et al. ....... 1/1 |
| 6,128,540 A | 10/2000 | Van Der Vegt et al. |
| 6,151,624 A * | 11/2000 | Teare et al. ............... 709/217 |
| 6,456,288 B1 | 9/2002 | Brockway et al. |
| 6,518,989 B1 | 2/2003 | Ishikawa |
| 6,867,781 B1 | 3/2005 | Van Hook et al. |
| 6,947,037 B1 | 9/2005 | Lynn et al. |
| 7,023,437 B1 | 4/2006 | Voorhies et al. |
| 7,069,095 B2 * | 6/2006 | Nelson et al. ............... 700/98 |
| 7,266,616 B1 | 9/2007 | Munshi et al. |
| 7,307,640 B2 | 12/2007 | Demers et al. |
| 7,423,653 B2 | 9/2008 | Gettman et al. |
| 7,523,411 B2 | 4/2009 | Carlin |
| 7,596,418 B2 | 9/2009 | Bugosh |
| 7,624,349 B2 | 11/2009 | Seemann et al. |
| 7,629,985 B2 | 12/2009 | McArdle et al. |
| 7,639,261 B2 * | 12/2009 | Sekine et al. ............... 345/582 |
| 7,701,461 B2 | 4/2010 | Fouladi et al. |
| 7,878,148 B2 | 2/2011 | Swenson et al. |
| 2001/0047250 A1 * | 11/2001 | Schuller et al. ............... 703/1 |
| 2002/0030689 A1 | 3/2002 | Eichel et al. |

(Continued)

OTHER PUBLICATIONS

Office Action in U.S. Appl. No. 12/040,725 mailed Jun. 7, 2011.

(Continued)

*Primary Examiner* — Weilun Lo
*Assistant Examiner* — Rashedul Hassan
(74) *Attorney, Agent, or Firm* — Patterson + Sheridan, L.L.P.

(57) ABSTRACT

Embodiments of the invention provide system and methods for organizing, browsing and editing materials stored in a computer system. The system is configured to dynamically create an organizational structure for the materials according to classification groups specified by the creator of each stored material. Additionally, the system is configured to expose certain editable material parameters of a selected material to the end-user and make available specific GUI elements to the end-user so that the end-user can edit the selected material, thereby changing the appearance of the material.

16 Claims, 6 Drawing Sheets

(56) References Cited

U.S. PATENT DOCUMENTS

| | | | |
|---|---|---|---|
| 2002/0039101 A1* | 4/2002 | Fernandez et al. | 345/581 |
| 2003/0031371 A1 | 2/2003 | Kato et al. | |
| 2003/0167213 A1* | 9/2003 | Jammes et al. | 705/27 |
| 2003/0182004 A1* | 9/2003 | Linder et al. | 700/97 |
| 2003/0226116 A1* | 12/2003 | Kuwata et al. | 715/530 |
| 2004/0109563 A1 | 6/2004 | Evans et al. | |
| 2004/0162845 A1* | 8/2004 | Kim et al. | 707/102 |
| 2004/0174998 A1 | 9/2004 | Youatt et al. | |
| 2004/0239679 A1 | 12/2004 | Ito et al. | |
| 2005/0062738 A1* | 3/2005 | Handley et al. | 345/419 |
| 2005/0081161 A1 | 4/2005 | MacInnes et al. | |
| 2005/0125747 A1* | 6/2005 | Nelson et al. | 716/1 |
| 2005/0237335 A1 | 10/2005 | Koguchi et al. | |
| 2005/0267721 A1 | 12/2005 | Thalhammer-Reyero | |
| 2006/0039674 A1* | 2/2006 | Sonoda et al. | 386/52 |
| 2006/0052984 A1* | 3/2006 | Nakadate et al. | 702/182 |
| 2006/0072164 A1 | 4/2006 | Kato et al. | |
| 2006/0098023 A1 | 5/2006 | Coulthard | |
| 2006/0101431 A1 | 5/2006 | Pepin et al. | |
| 2006/0164414 A1 | 7/2006 | Farinelli | |
| 2006/0176316 A1 | 8/2006 | Nagasaki et al. | |
| 2006/0232583 A1 | 10/2006 | Petrov et al. | |
| 2006/0242164 A1* | 10/2006 | Evans et al. | 707/100 |
| 2006/0253214 A1 | 11/2006 | Gross | |
| 2006/0294125 A1 | 12/2006 | Deaven | |
| 2007/0018990 A1 | 1/2007 | Shreiner | |
| 2007/0018996 A1 | 1/2007 | Wang et al. | |
| 2007/0083505 A1* | 4/2007 | Ferrari et al. | 707/5 |
| 2007/0083805 A1 | 4/2007 | Randazzo et al. | |
| 2007/0165035 A1 | 7/2007 | Duluk, Jr. et al. | |
| 2007/0195085 A1 | 8/2007 | Farinelli | |
| 2007/0233678 A1* | 10/2007 | Bigelow | 707/6 |
| 2007/0268297 A1 | 11/2007 | Novosad | |
| 2008/0088630 A1 | 4/2008 | Bakalash et al. | |
| 2008/0091491 A1 | 4/2008 | Thorpe et al. | |
| 2008/0266296 A1 | 10/2008 | Ramey et al. | |
| 2009/0073187 A1 | 3/2009 | Rampson et al. | |
| 2009/0138113 A1 | 5/2009 | Hoguet | |
| 2009/0160856 A1 | 6/2009 | Hoguet | |
| 2009/0254611 A1 | 10/2009 | Pena et al. | |
| 2009/0265301 A1 | 10/2009 | Chen et al. | |
| 2010/0046846 A1 | 2/2010 | Brown | |

OTHER PUBLICATIONS

"Mental Mill Functional Overview," Mental Images GmbH, White Paper, Feb. 11, 2007 (15 pages).
Office Action dated Aug. 6, 2009 for German Pat. App. No. 102009007334.5.
English Translation of Office Action dated Aug. 6, 2009 for German Pat. App. No. 102009007334.5.
"Bildsynthese" (German), Wikipedia, available at http://de.wikipedia.org/wiki/Bildsynthese, Aug. 2009.
"Grafikpipeline" (German), Wikipedia, available at http://de.wikipedia.org/wiki/Grafikpipeline, Aug. 2009.
"Textur (Computergrafik)" (German), Wikipedia, available at http://de.wikipedia.org/wiki/Textur_(Computergrafik)., Aug. 2009.
"Texture Mapping" (German), Wikipedia, available at http://de.wikipedia.org/wiki/Texture_Mapping, Aug. 2009.
"Image Synthesis," English Translation of "Bildsynthese" (German), Aug. 2009.
"Graphics Pipeline," English Translation of "Grafikpipeline" (German), Aug. 2009.
"Texture (Computer Graphics)," English Translation of "Textur (Computergrafik)" (German), Aug. 2009.
"Texture Mapping," English Translation of "Texture Mapping" (German), Aug. 2009.
Office action dated Jan. 27, 2012 for U.S. Appl. No. 12/259,205.
Final Office Action dated Jul. 19, 2012 for U.S. Appl. No. 12/259,205.

* cited by examiner

US 8,601,398 B2

DATA-DRIVEN INTERFACE FOR MANAGING MATERIALS

BACKGROUND OF THE INVENTION

1. Field of the Invention

The present invention generally relates to computer software. More specifically, the present invention relates to a data-driven interface for managing materials.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable two-dimensional (2D) or three-dimensional (3D) construct. Initially, such a construct is defined in part by the regions making up the surface of that construct. A rendering application may be used to add detail to the construct by mapping material texture maps onto various regions of the construct. Additionally, computer models can be static or animated, where time is a fourth dimension. For example, rendering a motion-blurred object is a four-dimensional (4D) rendering process. Computer models may also be implemented as computer simulations that use material texture maps.

Material texture maps, or materials, can be defined according to a variety of parameters, generally related to the type of material represented. For example, a glassy material may be defined in part by a reflectivity parameter, while a concrete material may be defined in part by a coarseness parameter. Materials used by rendering engines may be edited by changing some or all of these parameters in order to create new materials or modify existing ones. Users of various rendering engines may apply materials to multi-dimensional constructs in different ways according to their specific needs. For example, an architect may use a hardwood floor material as an indoor floor surface, and a grass material as an outdoor floor surface; alternatively, a video game designer may use either material for a variety of purposes, including animation and/or simulation, within a virtual environment. Either user views the materials available to their rendering engine using a conventional material browser.

Current user interfaces for materials are generally programmed manually by a computer programmer in C++ or other programming languages. To alleviate some of the inefficiency associated with programming each material user interface, software has been created such as QT Designer, or general-purpose user interface languages such as Microsoft XAML, that allow a user to interactively place interface elements for parameters of known materials. However, such systems are cumbersome because the interface for each material must still be created manually.

As the foregoing illustrates, there remains a need in the art for a flexible and extensible materials browser that overcomes one or more of the problems set forth above.

SUMMARY OF THE INVENTION

One embodiment of the present invention sets for a method for generating an organizational structure for a set of materials stored within a computer system. The method includes the steps of parsing classification data associated with each material in the set of materials, for each material, determining one or more classification groups to which the material belongs based on the classification data associated with the material, and generating the organizational structure for the set of materials based on the one or more classification groups determined for each material, where each classification group to which a particular material belongs resides at a different level of the organizational structure. The method also includes the step of causing the organizational structure to be displayed to an end-user through a graphical user interface.

One advantage of the disclosed method is that the organizational structure of the materials is dynamically generated and displayed to the end-user via a graphical user interface common to all of the stored materials. In addition, certain editable materials parameters for a selected material are exposed to the end-user via the graphical user interface, and the graphical user interface is configured to enable the end-user to edit the selected material. Creators of the stored materials simply have to include certain classification and editable parameters information in those materials to enable these functionalities. Among other things, there is no need to generate a separate graphical user interface for each stored material, as is required with prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
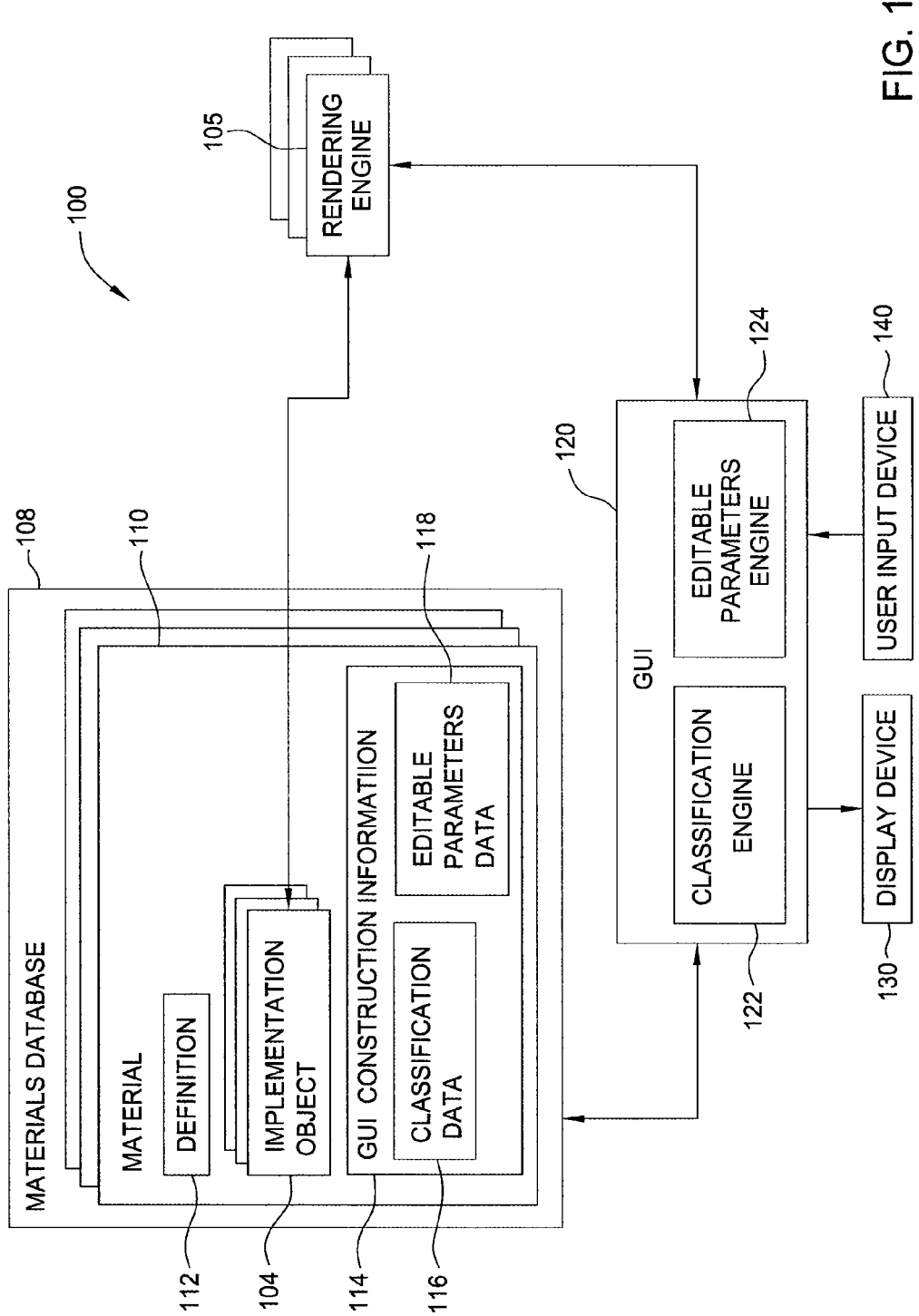
FIG. 1 illustrates a computer system configured to implement one or more aspects of the present invention.

FIG. 1 illustrates a computer system 100 configured to implement one or more aspects of the present invention. The components illustrated in FIG. 1 may include computer software applications executing on existing computer systems, e.g., desktop computers, server computers, laptop computers, tablet computers, video game consoles, and the like. The software applications described herein, however, are not limited to any particular computer system and may be adapted to take advantage of new computer systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user interface (GUI) 120 may include a software program executing on a client computer system at one physical location communicating with a rendering application 105 at another physical location. Also, in one embodiment, the rendering application 105 and the GUI 120 may be provided as an application program (or programs) stored on computer readable media such as a CD-ROM, DVD-ROM, flash memory module, or other tangible storage media. In one embodiment, the application program may be any type of application program that interacts with materials, including a rendering application, a simulation application, a CAD application, an animation application, or the like.

As shown, the computer system 100 includes, without limitation, one or more rendering engines 105, a materials database 108 that stores one or more materials 110, the GUI 120, a display device 130, and a user input device 140. The rendering engine 105 is configured to allow users interacting with the GUI 120 to render thumbnail views and previews of the materials 110 and display those views on the display device 130 via the GUI 120. The materials database 108 may be located within any memory subsystem within the computer system 100 or on a machine remote to the computer system 100. In certain embodiments, the materials database 108 may be distributed across memory locations within the computer system 100 or between the computer system 100 and a machine remote to the computer system 100.

Each material 110 includes a definition 112, one or more implementation objects 104, and GUI construction information 114. As is well-known, the definition 112 typically includes the executable code underlying the material 110. Within the definition 112 resides a global set of appearance attributes for the material 110 referred to herein as "material parameters." The material parameters may include color, grain, reflectivity, coarseness, or any other parameters that convey the physical appearance of the material 110. For example, a material representing brick could include height, width, and grout thickness parameters; whereas, a material representing wall paint could include color and finish parameters. When generating the material 110, the creator of the material 110 designates one or more of the material parameters as being "editable", meaning that these material parameters may be exposed to the end-user so that the end-user can modify the values of these material parameters to alter the appearance of the material 110. The creator of material 110 may implement different versions of the same material 110 by exposing different sets of editable material parameters to the end-user.

The implementation objects 104 provide a translation of the material parameters of the material 110 into a format recognized by the relevant rendering engine 105. For example, one of the rendering engines 105 may expect the brightness parameter for a material to be provided on a scale of 0 to 1, while the material 110 may define brightness on a scale of 1 to 100. The implementation object 104 associated with that rendering engine 105 would thus scale the brightness parameter of the material 110 to a relative value between 0 and 1, thereby providing a value that the rendering engine 105 could recognize.

The GUI construction information 114 is generated by the creator of the material 110 and includes information used to configure the GUI 120 relative to a particular material 110. As shown, the GUI construction file 114 includes classification data 116 and editable parameters data 118. In one embodiment, the classification data 116 is a text file that includes the name of the material 110 and a list of key words that describe the placement of the material 110 within an overall organizational structure for all the materials 110 in the materials database 108. In one embodiment, the organizational structure reflects a hierarchy of "classification groups" to which the materials 110 in the materials database 108 belong. Within this hierarchy, a given classification group may include one or more other classification groups, or subgroups. The key words included in the classification data 116 associated with a particular material 110 correspond to the different classification groups within the organizational structure to which that materials 110 belongs. More specifically, each keyword in the classification data 116 sets forth a different classification group within the organizational structure to which the material 110 belongs, where each such classification group resides at a different level within the organizational structure. The creator of the material 110 associates the material 110 with a classification group at a particular level within the organizational structure simply by including the keyword associated with that classification group in the classification data 116. The keywords associated with the different classification groups with which the material 110 is associated may be included in the classification data 116 as text strings and may appear in any order.

In one embodiment, the editable parameters data 118 is a text file that sets forth the editable material parameters associated with the material 110 and the particular elements of the GUI 120 that allow the end-user to modify those editable material parameters (referred to herein as "implemented GUI elements"). The creator of the material 110 may choose from a variety of implemented GUI elements for each editable material parameter. For example, the implemented GUI element used to modify a color parameter could be a color bar, a color wheel, or some other similar implemented GUI element. The creator of the material 110 includes key words in the editable parameters data 118 that associate one implemented GUI element with a different one of the designated editable material parameters. The name of each editable material parameter and the implemented GUI element associated with the editable material parameter are included in the editable parameters data 118 as text strings when the material 110 is created.

The GUI 120 is a data-driven user interface whose underlying functionality is implemented by a classification engine 122 and an editable parameters engine 124. The classification engine 122 is configured to access the materials database 108, parse the classification data 116 associated with every material 110 in the materials database 108, and generate an organizational structure that includes every classification group associated with the materials 110 in the materials database 108. The classification engine 122 is further configured to populate the different levels of the organizational structure with the names of the materials, the different classification groups residing at each level of the organizational structure, and which materials 110 belong to those classification groups. Again, the classification engine 122 makes these determinations based on the classification data 116 associated with each material 110. The populated organizational structure may be displayed to the end-user on the display device 130 via the GUI 120. The end-user can then search the materials database 108 for a particular material 110 by inputting one or more classification groups into the GUI 120 via the user input device 140. The classification engine 122 is configured to identify and retrieve from the materials database 108 the materials 110 associated with the user-specified classification groups. Thumbnail views of each retrieved material may be displayed to the end-user on the display device 130 via the GUI 120.

Based on an end-user's selection of a given material 110 for editing, the editable parameters engine 124 is configured to parse the editable parameters data 118 associated with that material 110 and expose the editable material parameters designated for the material 110 to the end-user via the GUI 120. In addition, the editable parameters engine 124 configures the GUI 120 with the implemented GUI element associated with each editable material parameter designated for the material 110, as also specified in the editable parameters data 118. The editable material parameters designated for the material 110 are displayed within the GUI 120 with default values that inform the initial appearance of the material 110. The end-user may then alter the appearance of the material 110 by manipulating the implemented GUI elements to modify the value of the editable material parameters displayed for the material 110.

The GUI 120 is displayed to the end-user via the display device 130. The display device 130 may be a CRT or LCD display or any other type of display device. Input is received from the user via the user input device 140, which may be a mouse pointing device, a keyboard, a joystick, a video game controller, or any other type of user input device.

Figure 2:
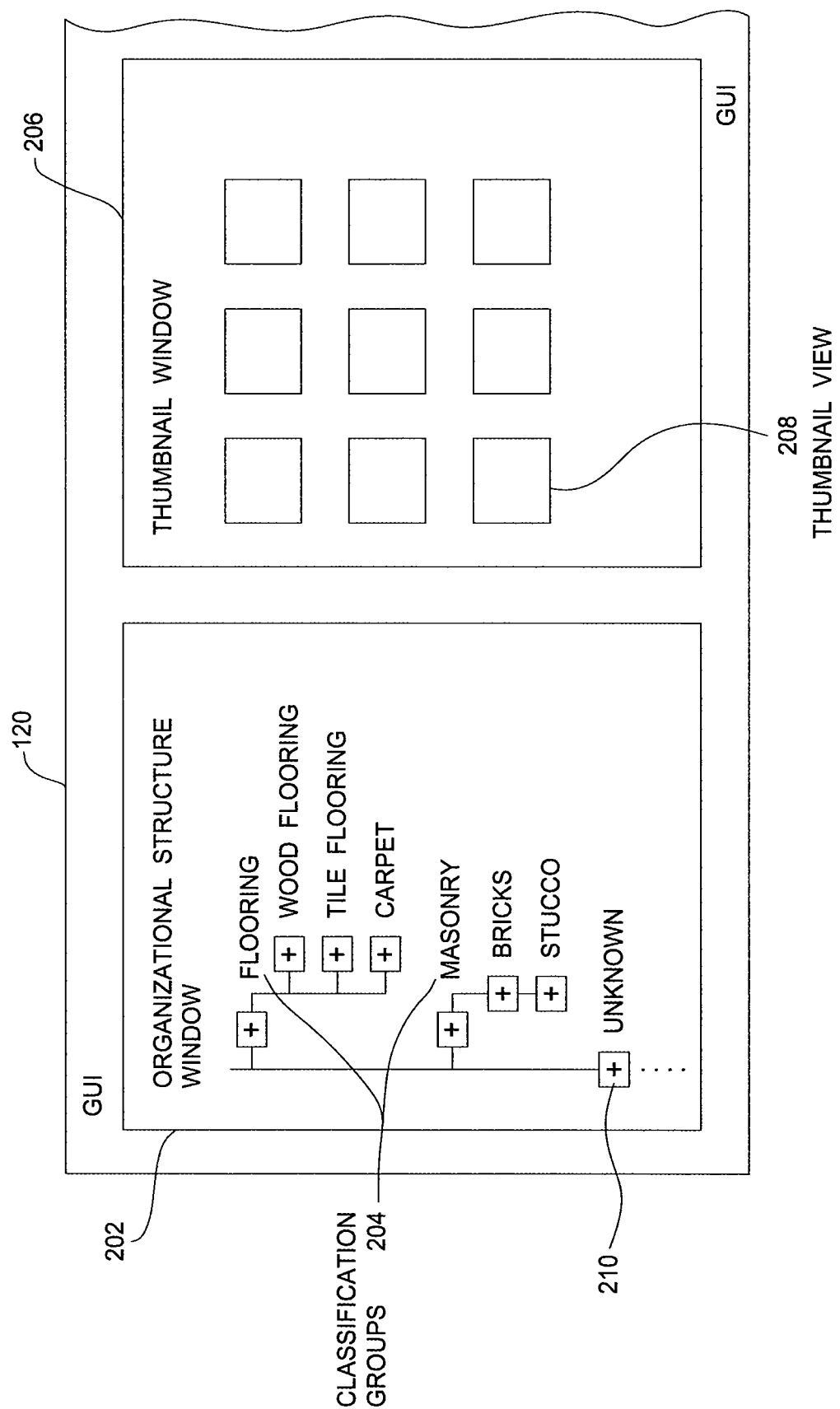
FIG. 2 is a conceptual diagram representing a portion of the GUI of FIG. 1 configured to display the organizational structure of the materials within the materials database, according to one embodiment of the invention.

FIG. 2 is a conceptual diagram representing a portion of the GUI 120 configured to display the organizational structure of the materials 110 within the materials database 108, according to one embodiment of the invention. As shown, the GUI 120 includes an organizational structure window 202 and a thumbnail window 206. The organizational structure of the materials 110 within the database 108 generated by the classification engine 122 is displayed in the organizational structure window 202. The end-user may inspect the contents of each level of the organizational structure by selecting with a mouse or otherwise indicating with another user input device 140 a specific classification group 204. The classification engine 122 then causes the contents of the selected classification group 204, which, in different embodiments, may include either the names of the materials 110 belonging to that classification group or additional classification groups 204 found within that classification group 204, to be displayed to the end-user. For example, in one embodiment, the material 110 may be located in the organizational structure by selecting any of the classification groups 204 to which that material belongs. For example, a hardwood floor material that belongs to both a flooring group and a wood flooring group would be found by selecting either classification group, as the classification engine 122 would cause all of the materials 110 belonging to the selected classification groups to be displayed to the end-user. In alternative embodiments, when a classification group 204 includes other classification groups, the end-user locates a particular material 110 by selecting successive classification groups 204 in the organizational structure. For example, the hardwood floor material belongs to both the flooring group and the wood flooring group and would be found by first selecting the flooring group and then selecting the wood flooring group.

The classification engine 122 also is configured to cause thumbnail views 208 of all materials 110 belonging to the selected classification groups 204 to be displayed to the end-user in a thumbnail image window 206 along with the names of each material 110. The end-user may then select a specific material 110 for editing by selecting with a mouse or otherwise indicating with another user input device 140 the specific material 110.

In one embodiment, the classification engine 122 is configured to associate each material 110 in the database 108 with one or more classification groups based on a "best guess" regarding the classification groups to which that material belongs. More specifically, to the extent that a key word found in the classification data 116 for a material 110 cannot be precisely associated with one of the classification groups 204 present in the organizational structure, the classification engine 122 automatically associates the material 110 with the classification group 204 that most closely aligns with that particular keyword. In a situation where a best guess cannot be determined, the classification engine 122 is configured to generate a classification group of "unknown" materials within the organizational structure that includes all materials 110 that cannot be accurately placed within one of the other classification groups 204. An example of such a default classification group is provided by an unknown classification group 210 in FIG. 2.

Figure 3:
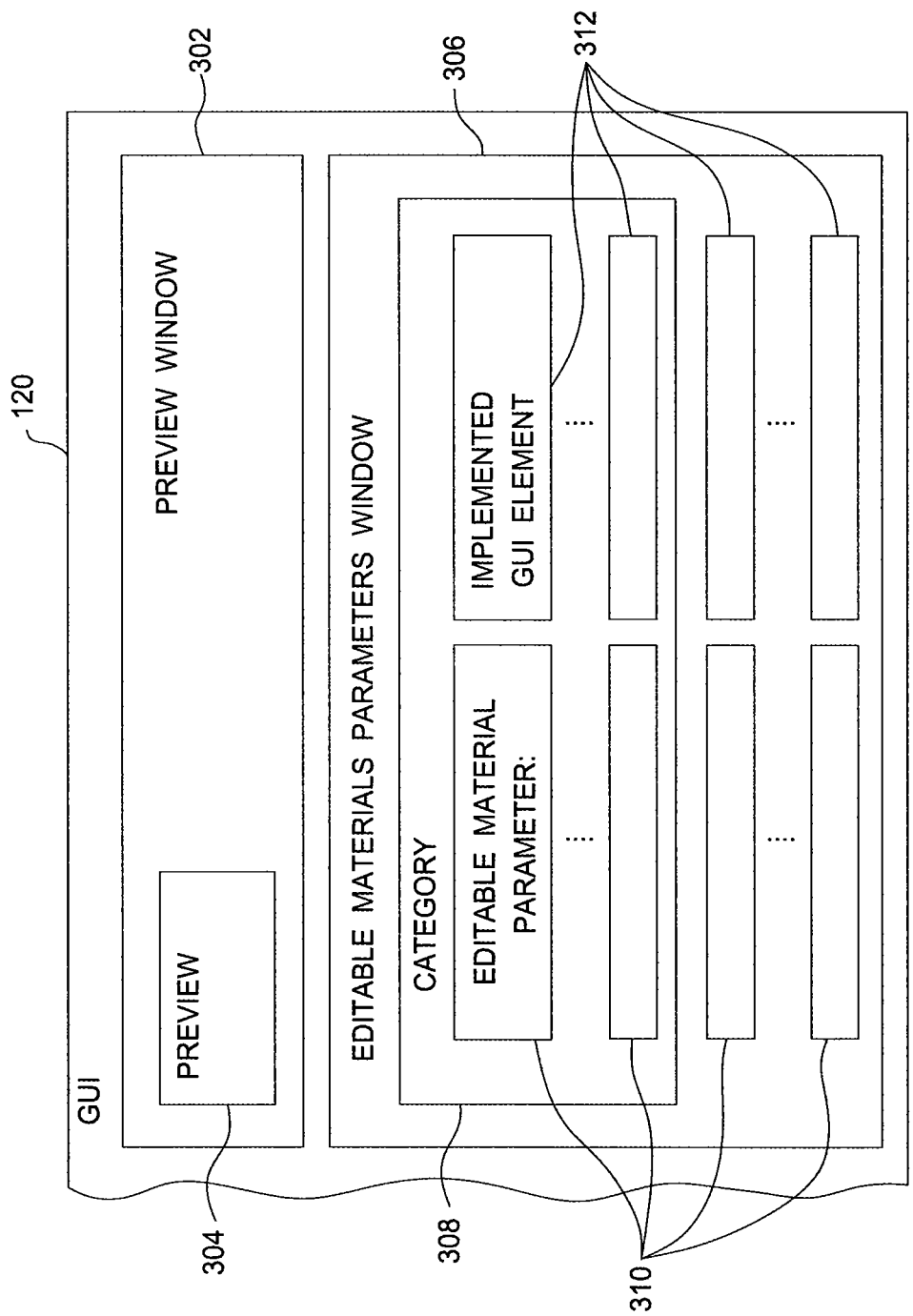
FIG. 3 is a conceptual diagram representing a portion of the GUI of FIG. 1 configured to enable an end-user to edit a selected material, according to one embodiment of the invention.

FIG. 3 is a conceptual diagram representing a portion of the GUI 120 configured to enable an end-user to edit a selected material 110, according to one embodiment of the invention. As described herein, the end-user may select one of the materials 110 displayed in the thumbnail window 206 for editing by selecting the appropriate thumbnail view 208. After the material 110 has been selected, the editable parameters engine 124 is configured to cause a preview 304 of that material 110 to be displayed to the end-user in a preview window 302 of the GUI 120. In one embodiment, the editable parameter data 118 associated with the material 110 specifies whether such a preview 304 should be displayed. The editable parameters engine 124 also causes editable material parameters 310 for the material 110 to be exposed to the end-user via an editable parameters window 306 of the GUI 120 and configures the GUI 120 with the implemented GUI elements 312 corresponding to the different editable material parameters 310.

As shown, in various embodiments, related editable material parameters 310 and their corresponding implemented GUI elements 312 may be organized and displayed in a category 308. For example, a "color" category may include three editable parameters corresponding to red, green and blue (RGB) color values as well as an editable transparency parameter and an editable contrast parameter. As a category, these five editable parameters and their corresponding implemented GUI elements may be displayed together in a specific area of the editable parameters window 306. In addition, some of the editable material parameters 310 belonging to a particular category 308 may be displayed while other editable material parameters 310 in the category 308 may be suppressed. For example, the color parameters in a color category may be displayed, while the contrast and transparency parameters in that category may be suppressed. In one embodiment, the creator of the material 110 selects one or more categories from a pre-defined set of categories to include in the editable parameters data 118 associated with the material 110. When the editable materials engine 124 parses the editable parameters data 118 and reads the key word associated with a selected category, the editable materials engine 124 is configured to automatically expose the editable material parameters included in that category via the editable parameters window 306 of the GUI 120 as well as configure the GUI 120 with the implemented GUI elements corresponding to those editable material parameters. Thus, the creator of the material 110 does not have to specify all of specific editable material parameters included in a selected category in the editable materials data 118. In addition, the editable parameters data 118 also specifies which, if any, editable material parameters in each category are to be suppressed.

As previously described herein, the end-user may change the values of the editable material parameters 310 by manipulating the different corresponding implemented GUI elements 312. When the editable material parameter values are changed, the editable parameters engine 124 is configured to generate an updated preview 304 that reflects those changes and cause the updated preview 304 to be displayed to the end-user in the preview window 302. The end-user may then save the modified material 110 as a modified version of the selected material 110 via the editable parameters engine 124. The modified version inherits the GUI construction file 114 from the original material 110, allowing the editable parameters engine 124 to then expose the editable parameters 310 and corresponding implemented GUI elements 312 of the modified material 110 according to the inherited editable parameters data 118. The classification engine 122 is configured to places the modified material 110 within the organizational structure according to the inherited classification data 116.

Figure 4:
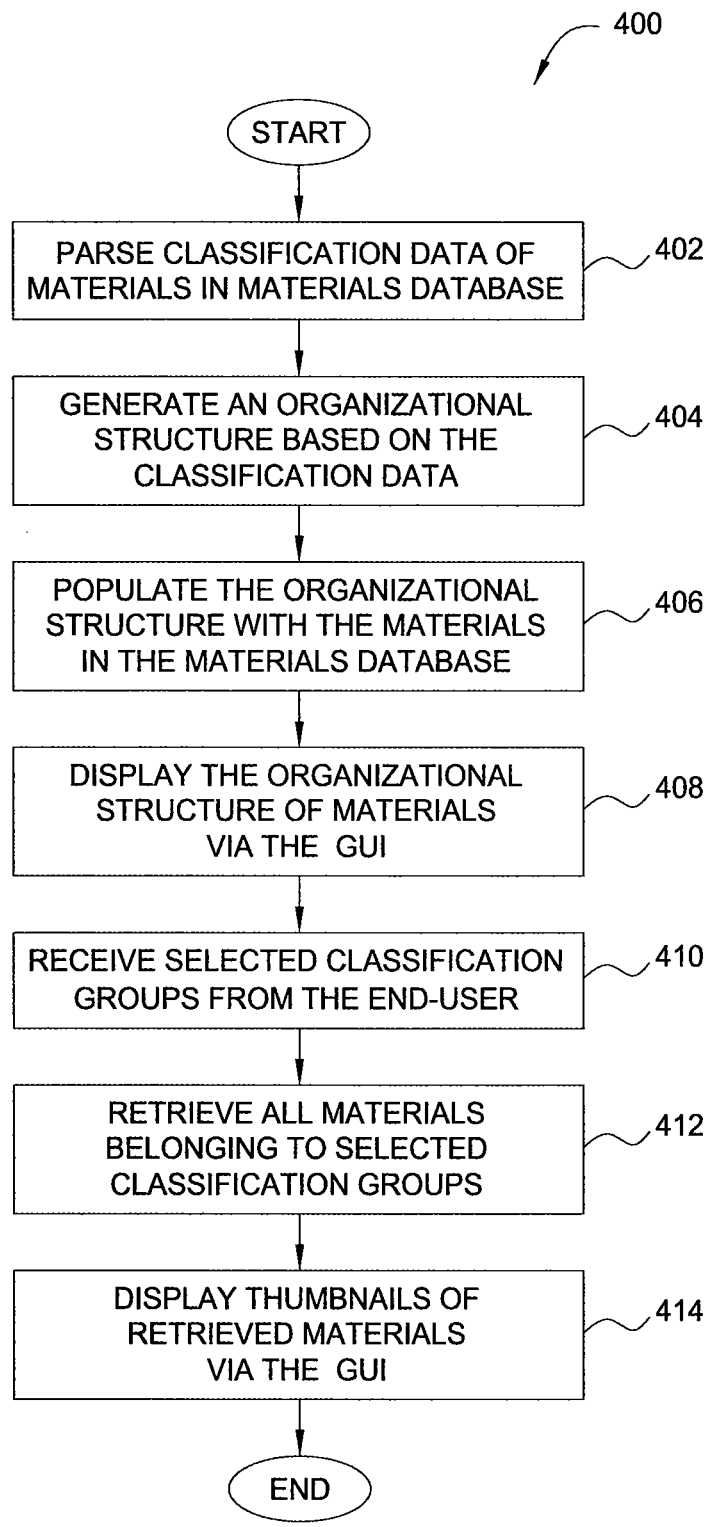
FIG. 4 is a flowchart of method steps for generating an organizational structure for a set of materials stored within a computer system, according to one embodiment of the invention.

FIG. 4 is a flowchart of method steps for generating an organizational structure for a set of materials stored within a computer system, according to one embodiment of the invention. Persons skilled in the art will understand that, even though the method is described in conjunction with the systems of FIGS. 1-3, any system configured to perform the method steps, in any order, is within the scope of the present invention.

As shown, the method 400 begins at step 402, where the classification engine 122 parses the classification data 116 associated with every material 110 in the materials database 108. At step 404, the classification engine 122 generates an organizational structure for the materials 110 based on key words found in the classification data 116 associated with the materials 110 that indicate the various classification groups to which the different materials 110 belong and the relationships among those various classification groups. At step 406, the classification engine 122 populates the different classification groups within the organizational structure with the names of the different materials 110 based on the various material names found in the classification data 116 and the knowledge of which materials 110 belong to which classification groups derived from the key words in the classification data 116. At step 408, the classification engine 122 causes the organizational structure of the materials 110 to be displayed to the end-user via the GUI 120.

The method 400 then proceeds to step 410, where the classification engine 122 receives a selection of one or more classification groups from the end-user. At step 412, the classification engine 124 retrieves all of the materials 110 within the materials database 108 belonging to the selected classification groups. At step 414, the classification engine 122 causes thumbnail views 208 of the retrieved materials to be displayed to the end-user via the GUI 120.

Figure 5:
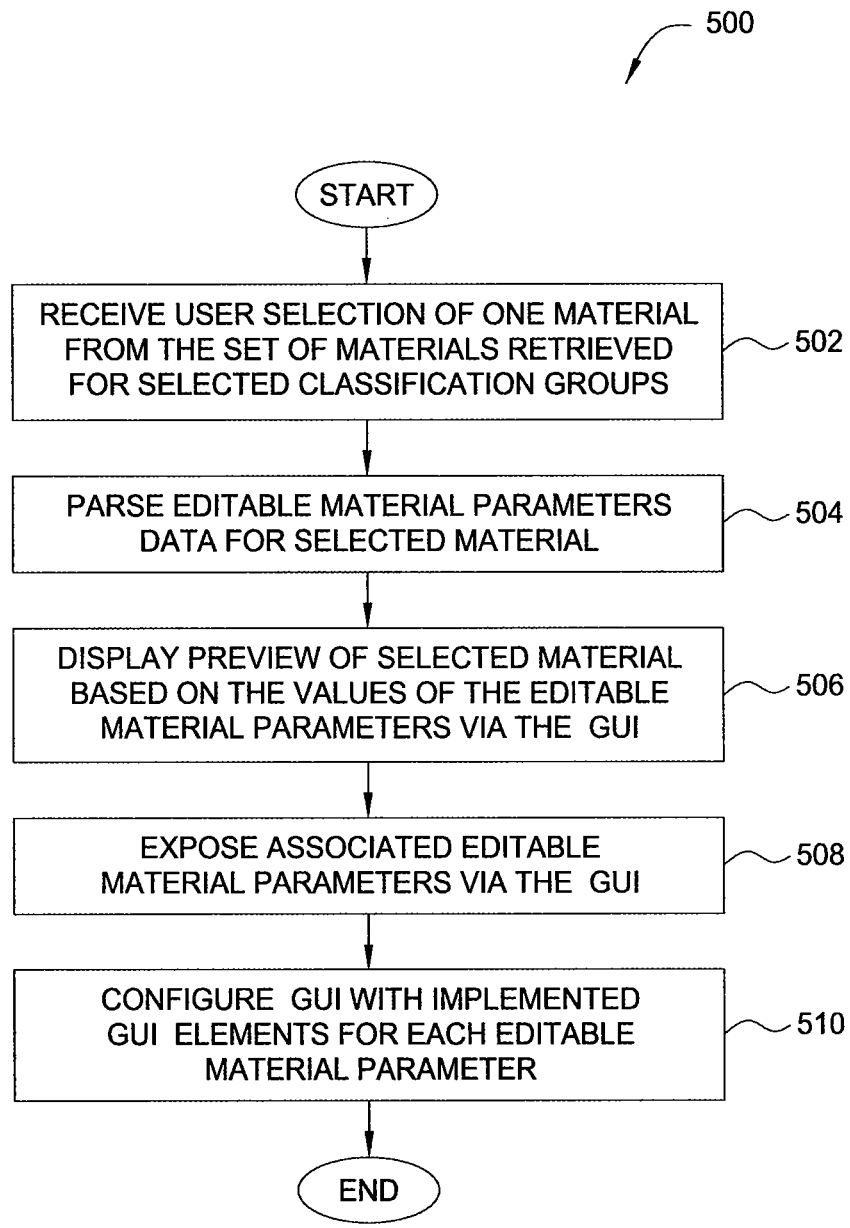
FIG. 5 is a flowchart of method steps for generating a portion of a GUI for altering the appearance of a material, according to one embodiment of the invention.

FIG. 5 is a flowchart of method steps for generating a portion of the GUI 120 for altering the appearance of a material, according to one embodiment of the invention. Persons skilled in the art will understand that, even though the method is described in conjunction with the systems of FIGS. 1-3, any system configured to perform the method steps, in any order, is within the scope of the present invention.

As shown, the method 500 starts at step 502, where the editable parameters engine 124 receives a selection of a material 110 from a set of materials 110 retrieved from the database 108 belonging to a particular classification group 204. At step 504, the editable parameters engine 124 parses the editable parameters data 118 associated with the selected material 110. At step 506, if set forth in the editable parameters data 118, the editable parameters engine 124 causes a preview 304 of the selected material 110 to be displayed to the end-user via the preview window 302 of the GUI 120. At step 508, the editable parameters engine 124 causes one or more editable material parameters 310 associated with the selected material 110 to be exposed to the end-user via the editable parameters window 306 of the GUI 120. To the extent related editable material parameters belong to a particular category, that category is exposed to the end-user as well. At step 510, the editable parameters engine 124 configures the GUI 120 with the implemented GUI element 312 associated with each editable material parameter 310. The appearance of the material 110 may then be altered by manipulating the implemented GUI element 312 associated with the editable parameters 310 to modify the values of those parameters.

Figure 6:
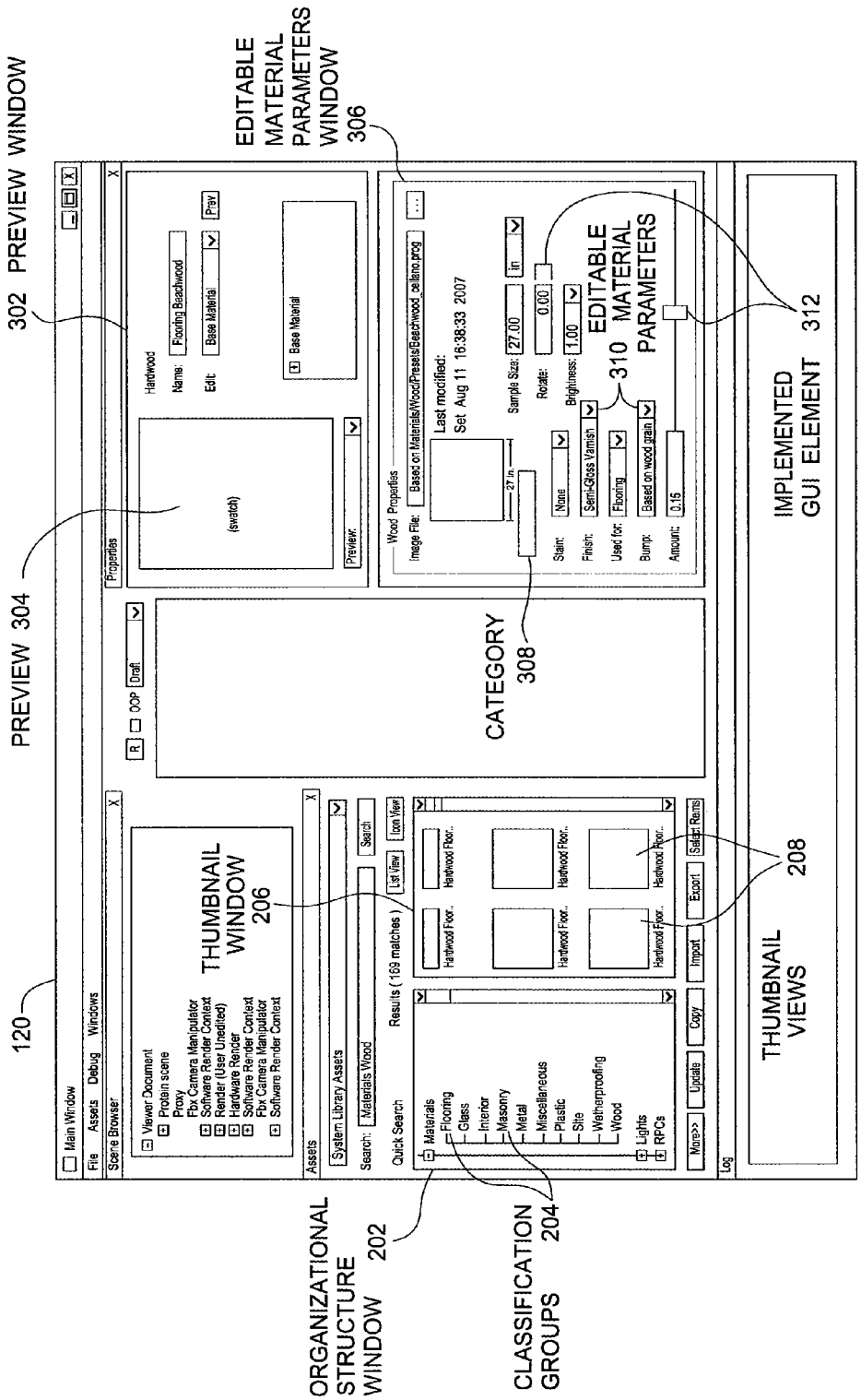
FIG. 6 is a screenshot of an exemplary GUI for a selected material, according to one embodiment of the invention.

FIG. 6 is a screenshot of an exemplary GUI 120 for a selected material 110, according to one embodiment of the invention. The organizational structure window 202 is configured to display the organizational structure generated by the classification engine 122. Thumbnail views 208 of the materials 110 belonging to a selected classification group are displayed in the thumbnail window 204 of the GUI 120. Once an end-user selects a particular material 110 for editing, a preview 304 of that material 110 is displayed in the preview window 302 of the GUI 120. The editable material parameters 310 associated with that material 110, the specific implemented GUI elements 312 used to modify the values of those editable material parameters 310, and the category 308, if any, to which one or more of the editable material parameters 310 belong are displayed to the end-user within the editable parameters window 304 of the GUI 120.

The disclosed systems and methods advantageously enable an organizational structure for a set of materials stored within a computer system to be dynamically created and presented to an end-user via a graphical user interface common to all of the stored materials. The stored materials may then be easily viewed and edited by the end-user via the graphical user interface. More specifically, with the framework disclosed herein, creators of the stored materials simply have to include certain classification and editable parameters information in those materials, and the systems described herein can automatically parse that information, organize and present the materials to the end-user, allow the end-user to search for any of the stored materials, and allow the end-user to edit any of the stored materials. Among other things, there is no need to generate a separate graphical user interface for each stored material, as is required with prior art approaches.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present inven-

We claim:

1. A method for generating an organizational structure for a set of materials stored within a computer system, the method comprising:

parsing classification data associated with each material in the set of materials, wherein each material comprises a texture map and includes a definition that specifies a set of material parameters for the material, one or more implementation objects, wherein each implementation object is configured to translate the set of material parameters for the material into a format recognized by a different rendering engine, and graphical user interface construction information that is used to configure a graphical user interface for the material, wherein the classification data associated with the material is included in the graphical user interface construction information;

for each material, determining one or more classification groups to which the material belongs based on the classification data associated with the material;

generating the organizational structure for the set of materials based on the one or more classification groups determined for each material, wherein each classification group to which a particular material belongs resides at a different level of the organizational structure; and causing the organizational structure to be displayed to an end-user through the graphical user interface.

2. The method of claim 1, wherein the set of materials is stored in a materials database that is distributed across two or more physical memory elements of the computer system.

3. The method of claim 1, further comprising the step of populating the organizational structure with at least one of the materials in the set of materials.

4. The method of claim 3, further comprising the step of receiving a selection of a first classification group within the organizational structure.

5. The method of claim 4, further comprising the step of retrieving data from the materials database associated with each material included in the first classification group.

6. The method of claim 5, further comprising the step of causing a thumbnail view of each material included in the first classification group to be displayed to the end-user through the graphical user interface based on the retrieved data.

7. The method of claim 1, wherein the classification data associated with each material comprises a text file.

8. The method of claim 7, wherein, for each material, the classification data associated with the material includes a key word for each classification group to which the material belongs.

9. A non-transitory computer-readable medium including instructions that, when executed by a processing unit, cause the processing unit to generate an organizational structure for a set of materials stored within a computer system, by performing the steps of:

parsing classification data associated with each material in the set of materials, wherein each material comprises a texture map and includes a definition that specifies a set of material parameters for the material, one or more implementation objects, wherein each implementation object is configured to translate the set of material parameters for the material into a format recognized by a different rendering engine, and graphical user interface construction information that is used to configure a graphical user interface for the material, wherein the classification data associated with the material is included in the graphical user interface construction information;

for each material, determining one or more classification groups to which the material belongs based on the classification data associated with the material;

generating the organizational structure for the set of materials based on the one or more classification groups determined for each material, wherein each classification group to which a particular material belongs resides at a different level of the organizational structure; and causing the organizational structure to be displayed to an end-user through the graphical user interface.

10. The computer-readable medium of claim 9, wherein the set of materials is stored in a materials database that is distributed across two or more physical memory elements of the computer system.

11. The computer-readable medium of claim 9, further comprising the step of populating the organizational structure with at least one of the materials in the set of materials.

12. The computer-readable medium of claim 11, further comprising the step of receiving a selection of a first classification group within the organizational structure.

13. The computer-readable medium of claim 12, further comprising the step of retrieving data from the materials database associated with each material included in the first classification group.

14. The computer-readable medium of claim 13, further comprising the step of causing a thumbnail view of each material included in the first classification group to be displayed to the end-user through the graphical user interface based on the retrieved data.

15. The computer-readable medium of claim 9, wherein the classification data associated with each material comprises a text file.

16. The computer-readable medium of claim 15, wherein, for each material, the classification data associated with the material includes a key word for each classification group to which the material belongs.

* * * * *